UNITED STATES PATENT OFFICE.

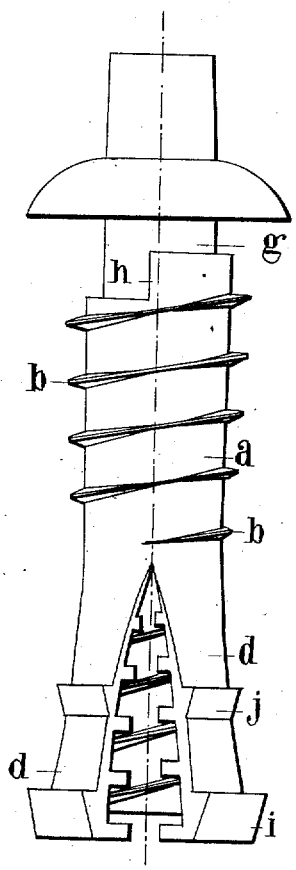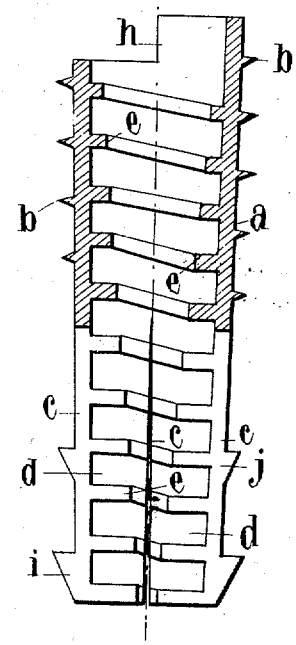

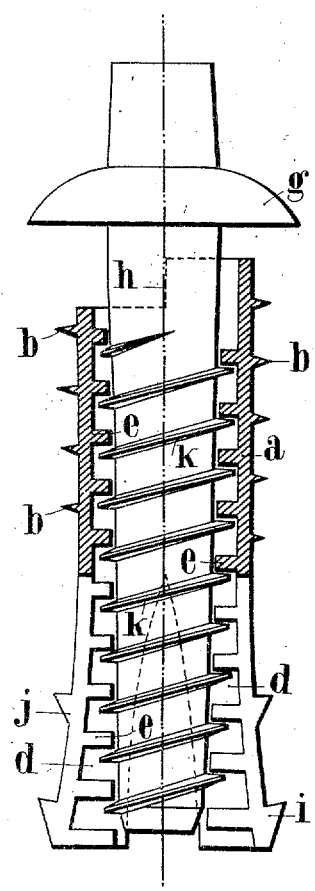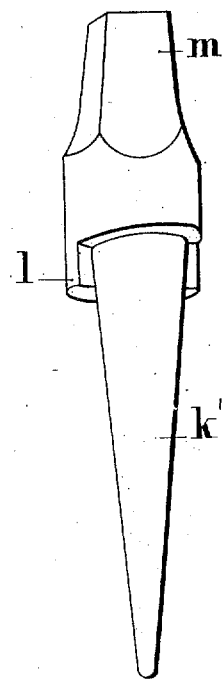

RAOUL DIAZ WAGNER, OF PARIS, FRANCE.

APERTURED BOLT APPLICABLE ESPECIALLY FOR FIXING RAILS ONTO THE WOODEN SLEEPERS.

1,021,390. Specification of Letters Patent. Patented Mar. 26, 1912.

Application filed October 20, 1910. Serial No. 588,170.

*To all whom it may concern:*

Be it known that I, RAOUL DIAZ WAGNER, a citizen of the Republic of France, and resident of Paris, France, have invented new and useful Improvements in Apertured Bolts Applicable Especially for Fixing Rails onto the Wooden Sleepers, which improvements are fully set forth in the following specification.

The use of ordinary lag screws or screw bolts for securing railway rails to the wooden ties has a disadvantage that, owing to the vibration caused by heavy traffic, such screws gradually become loosened slightly, and water seeping into the tie around the screw soon results in rotting the wood, and in destroying entirely the holding power of the bolts.

The present invention has for its object the provision of a device in the nature of a bolt anchor or expansion bolt which may be set into wooden ties and which is adapted to receive and firmly hold any ordinary lag screw having threads intended for engagement with wood. These expansion bolts may be used primarily for securing screws in soft wood or they may be inserted into an old opening in hardwood which has so rotted that the original screw has lost its holding power.

In order that my improved device may be clearly understood, reference is had to the accompanying drawing forming a part of this specification, and in which,—

Figure 1 is a vertical section of my improved expansion bolt or anchor before the insertion of the screw; Fig. 2 is a similar view showing the screw in position; Fig. 3 is a side elevation showing the complete anchor with the screw in position therein; and, Fig. 4 is a perspective view of a special key employed for setting the anchors in position.

Referring to the drawings in detail, my improved expansion bolt or anchor comprises a hollow body $a$ provided exteriorly with sharp edged screw threads $b$ such as are usually found on wood screws. The lower portion of the body is split in two or more places, as indicated at $c$, so as to provide a plurality of prongs or branches $d$ capable of being expanded. Annular barbed projections $i$ and $j$ are preferably formed on these branches and are adapted to bite into the wood.

On the inside, my improved anchor is provided with a continuous spiral flange $e$ which extends from one end to the other of the device. It will be particularly noted that the spaces between consecutive turns of this flange are much greater than the thickness of the flange itself, and that the width or depth of the flange increases gradually from the upper to the lower end of the bolt. This peculiar form of the flange results in the formation of a central tapering opening adapted to receive a lag screw.

$g$ represents such a screw, which has a broad head adapted to engage the rail flange and a shank provided throughout its length with sharp edged threads as is usual in wood screws. By reference to Fig. 2 it will be seen that the spiral flange $e$ is so proportioned that the threads $k$ of the screw $g$ engage with it perfectly.

The upper end of the expansion bolt or anchor is preferably formed with a notch $h$ adapted to be engaged by a correspondingly shaped shoulder $l$ formed on a special key, as shown in Fig. 4. This key has a polygonal or other usual head $m$ adapted to be engaged by an ordinary socket wrench, and comprises a smooth tapering shank $k'$ adapted to fit within the opening defined by the flange $e$, as will be evident from an inspection of Fig. 1.

In practice, when a lag screw or screw bolt has rotted or otherwise pulled out of its hole, the opening thus left may be enlarged to the required extent by means of an auger and the anchor, as shown in Fig. 1, inserted in the opening and screwed down into place by means of the special key shown in Fig. 4, in combination with an ordinary wrench. The end of a lag screw, such as $g$, may then be inserted in the upper end of the anchor and screwed down in the ordinary manner, the threads engaging with the spiral flange $e$ as shown in Fig. 2. The result of forcing the screw into the anchor is to expand the lower end thereof as illustrated in Figs. 2 and 3 and thus cause the barbs $i$ and $j$ to bite into the wood, thus assisting the threads $b$ in holding the device in position.

It will be observed that my improved anchor or expansion bolt is formed of but a single piece and that it is capable of use with any ordinary wood or lag screw, no special form of screw or bolt being necessary. It is therefore thought that the many advantages of my invention will be readily appreciated by those familiar with such matters.

What I claim is:—

1. An expansion bolt comprising a hollow body and a continuous flat spiral flange formed on the inside thereof, the width of said flange gradually increasing from one end to the other of said body.

2. An expansion bolt comprising a hollow body, split at one end and solid at the other, projections arranged on the outside of said body and adapted to bite into the material in which it is set, and a thin flat continuous spiral flange arranged on the inside of said body and adapted to engage the threads of an ordinary wood screw.

3. An expansion bolt comprising a hollow body exteriorly screw threaded and provided on the inside with a continuous spiral flange, the inner end of such flange determining an opening adapted to receive a threaded screw, said flange increasing in width from one end of the body to the other, whereby said opening is rendered tapering.

4. An expansion bolt comprising a hollow substantially cylindrical body, split adjacent one end, and continuous at its other end, such continuous end being provided with exterior screw threads, and the split end of said body having exterior projections adapted to constitute anchors, and a spiral flange projecting from the inner wall of said hollow body, and extending from one end to the other thereof the width of said flange increasing from one end of the body to the other.

In testimony whereof I have signed this specification in the presence of two subscribing witnesses.

RAOUL DIAZ WAGNER.

Witnesses:
EMILE LEDRET,
H. C. COXE.